United States Patent [19]
Abe

[11] Patent Number: 5,515,284
[45] Date of Patent: May 7, 1996

[54] STORAGE MEDIUM FOR MAP INFORMATION FOR NAVIGATION SYSTEM AND SYSTEM FOR OFFERING MAP INFORMATION FOR NAVIGATION SYSTEM

[75] Inventor: Tatsuhiko Abe, Saitama, Japan

[73] Assignee: Zexel Corporation, Tokyo, Japan

[21] Appl. No.: 425,353

[22] Filed: Apr. 19, 1995

Related U.S. Application Data

[63] Continuation of Ser. No. 946,582, Sep. 18, 1992, abandoned.

[30] Foreign Application Priority Data

Sep. 25, 1991 [JP] Japan ................................. 3-274636

[51] Int. Cl.$^6$ ..................... G08G 1/0969; G01C 21/00; G06F 165/00
[52] U.S. Cl. .................... 364/444; 364/443; 73/178 R
[58] Field of Search ...................... 364/443, 444, 364/449; 340/990, 995; 73/178 R

[56] References Cited

U.S. PATENT DOCUMENTS

| | | | |
|---|---|---|---|
| 4,630,209 | 12/1986 | Saito et al. | 364/444 |
| 4,633,433 | 12/1986 | Miller | 340/995 |
| 4,807,157 | 2/1989 | Fukushima et al. | 364/449 X |
| 4,891,760 | 1/1990 | Kashiwazaki et al. | 364/443 |
| 4,924,402 | 5/1990 | Ando et al. | 364/449 |
| 4,954,959 | 9/1990 | Moroto et al. | 364/449 |
| 4,982,332 | 1/1991 | Saito et al. | 364/449 |
| 4,984,168 | 1/1991 | Neukrichner et al. | 364/449 |
| 5,023,798 | 6/1991 | Neukrichner et al. | 364/449 |
| 5,036,471 | 7/1991 | Tamura et al. | 364/449 |
| 5,067,081 | 11/1991 | Person | 364/444 |
| 5,084,822 | 1/1992 | Hayami | 364/449 |
| 5,272,638 | 12/1993 | Martin et al. | 364/444 |
| 5,296,855 | 3/1994 | Matsuzaki et al. | 340/995 X |
| 5,305,219 | 4/1994 | Ishibashi et al. | 340/995 X |

FOREIGN PATENT DOCUMENTS

| | | |
|---|---|---|
| 3-77200 | 4/1991 | Japan . |
| 4-60416 | 2/1992 | Japan . |

Primary Examiner—Collin W. Park
Attorney, Agent, or Firm—Fish & Richardson

[57] ABSTRACT

A storage medium for map information for a navigation system includes an IC memory chip or an IC memory card of a small memory capacity. This storage medium stores detailed map information of a limited region including part of a highway network and information of the highway network covering a predetermined area which includes the limited region and is wider than the limited region. A system for offering map information for a navigation system includes two storage media. One storage medium is the same as the above-mentioned storage medium and the other storage medium has a small memory capacity. The other storage medium stores detailed map information of a limited region different from the limited region whose information is stored in the one storage medium.

9 Claims, 5 Drawing Sheets

STORAGE MEDIUM FOR MAP INFORMATION FOR NAVIGATION SYSTEM AND SYSTEM FOR OFFERING MAP INFORMATION FOR NAVIGATION SYSTEM

This application is a continuation of U.S. application Ser. No. 07/946,582, filed Sep. 18, 1992, now abandoned.

BACKGROUND OF THE INVENTION

This invention relates to a storage medium, such as an IC memory chip and an IC memory card, for storing map information for a navigation system, and also relates to a map information-offering system using such a map information storage medium.

A navigation system disclosed in Japanese Laid-Open Patent Application No. 4-60416 uses a CD-ROM as a map information storage medium. The CD-ROM has a large memory capacity, and therefore map information covering a wide range can be written onto it; however, generally, the read rate (read speed) of the CD-ROM is low. In this navigation system, the map information in the CD-ROM is divided into many regions, and map information of one region at which a vehicle is located at present is stored in another memory, and the navigation is carried out in accordance with the map information stored in this memory, thereby increasing the read rate. However, an expensive reader for reading the map information from the CD-ROM is required.

A navigation system disclosed in Japanese Laid-Open Patent Application No. 3-77200 uses an IC memory card as a map information storage medium. The read rate of the IC memory card is high, and a reader for the IC memory card is relatively inexpensive. However, the IC memory card has a small memory capacity, and therefore can only store map information covering a narrow range. Therefore, when the distance from a starting point to a destination is long, the optimum route can not beforehand be computed, and therefore the navigation along such optimum route can not be effected. Namely, when the distance from the starting point to the destination is long, it is only possible to provide a simple navigation in which the map information from the IC memory card is displayed, with the present position of the vehicle indicated on this displayed map information. And besides, in this navigation system, many IC memory cards, corresponding respectively to many regions located along the route of the vehicle, must be sequentially inserted into and removed from a slot portion of the navigation system. This provides a burden on the driver.

SUMMARY OF THE INVENTION

It is an object of this invention to provide a map information storage medium which can be used for a navigation of a wide range although it has a relatively small memory capacity.

Another object of the invention is to provide a map information-offering means which can offer navigation map information using only two storage media of a small memory capacity when the distance from a starting point to a destination is long.

According to one aspect of the present invention, there is provided a storage medium for map information for a navigation system storing:

(a) detailed map information of a limited region including part of a highway network; and (b) information of the highway network covering a predetermined area which includes the limited region and is wider than the limited region.

According to another aspect of the invention, there is provided a system for offering map Information for a navigation system, comprising:

(a) a first map information storage medium storing (i) detailed map information of a limited region including part of a highway network, and (ii) information of the highway network covering a predetermined area which includes the limited region and is wider than the limited region;

(b) a second map information storage medium storing detailed map information of another limited region which includes part of the highway network, and is located within the predetermined area, and is narrower than the predetermined area; and (c) reader means for reading the map information from the first and second map information storage media.

DESCRIPTION OF THE PREFERRED EMBODIMENTS

Figure 1:
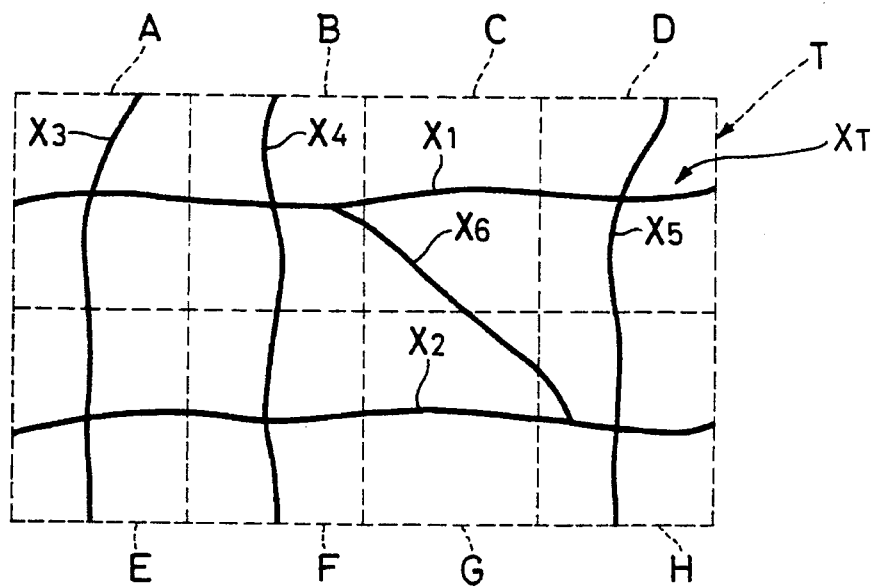
FIG. 1 is an illustration showing an image of a map of a certain country.

A map information storage medium according to the present invention will now be described with reference to FIGS. 1 to 3. FIG. 1 shows an image of a map of a certain country. A highway network $X_T$ is provided in a certain region (for example, the entire area T) of this country which is shown in a rectangular shape for the better understanding of the invention. The highway network $X_T$ includes highways $X_1$ and $X_2$ extending from the east to the west, highways $X_3$, $X_4$ and $X_5$ extending from the north to the south, and a highway $X_6$ extending from the northeast to the southwest. An ordinary road network (not shown) is also provided in the entire area. The only currently-available storage medium which can store the highway network $X_T$, the ordinary road network and other necessary map information over the entire area T is a CD-ROM. A relatively small storage medium such as an IC memory card and an IC memory chip can only store map information of a limited area much smaller than the entire area T.

In order to prepare the map information to be stored in the map information storage media of the present invention, the entire area T is divided into limited regions A to H, as shown in FIG. 1. Each of the limited regions A to H includes part of the highway network $X_T$, and is shown in a rectangular shape in FIG. 1 for the better understanding. Each map information storage media of the present invention stores the information of the highway network $X_T$ (including the information of interchanges in the highways) over the entire area T, and the detailed map information of a respective one of the limited regions A to H which includes the ordinary road network and other information. For example, as shown in FIG. 2, one map information storage medium stores the information of the highway network $X_T$ over the entire area T and the detailed map information of the limited region A. As shown in FIG. 3, another map information storage medium stores the information of the highway network $X_T$ over the entire area T and the detailed map information of the limited region H. Thus, each map information storage medium of the present invention need only to store a small amount of map information, and therefore can comprise an IC memory chip or an IC memory card.

Figure 4:
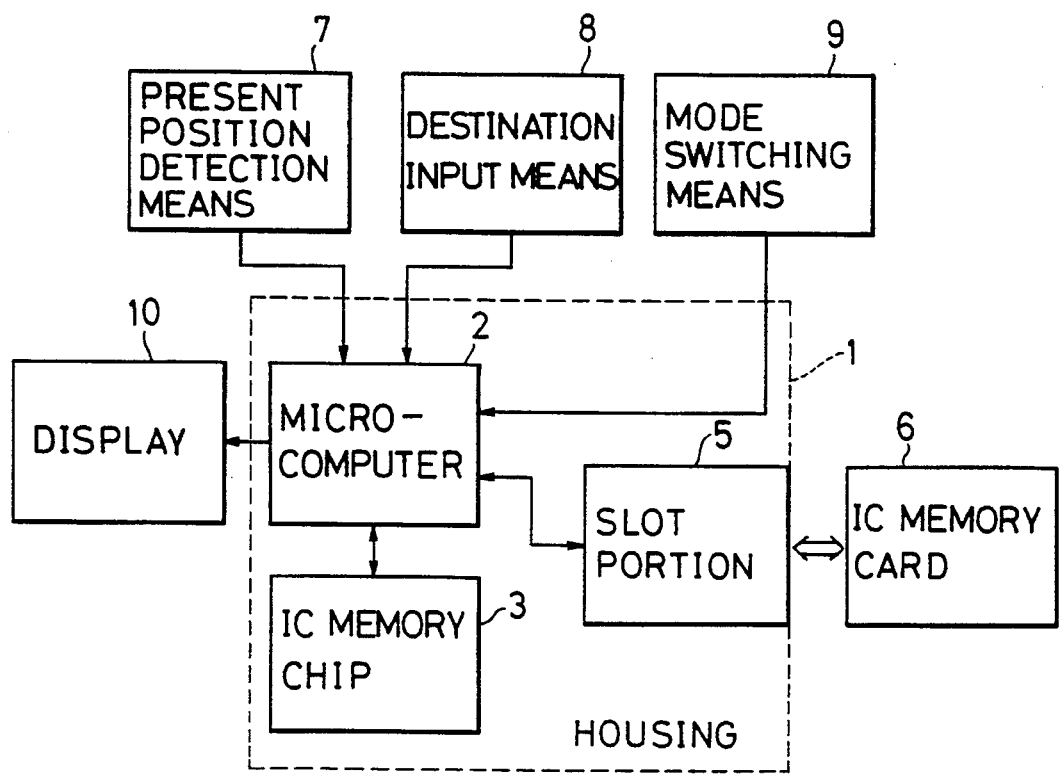
FIG. 4 is a block diagram showing a general construction of a navigation system incorporating a map information-offering system according to the present invention.
Figure 5:
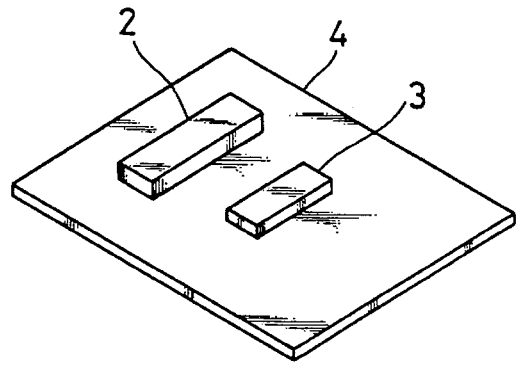
FIG. 5 is a perspective view showing a condition of mounting of a microcomputer and an IC memory chip on a printed circuit board.

FIG. 4 shows a navigation system incorporating a map information-offering system of the present invention. This navigation system comprises a microcomputer 2, and a nonvolatile IC memory chip 3 serving as a map information storage medium, the microcomputer 2 and the IC memory chip 3 being both provided within a housing 1. The IC memory chip 3 comprises, for example, an EEPROM. As shown in FIG. 5, the microcomputer 2 and the IC memory chip 3 are mounted on a printed circuit board 4, and are electrically connected together. In FIGS. 4 and 5, the showing of an interface associated with the microcomputer 2 is omitted. The housing 1 has a slot portion 5 electrically connected to the microcomputer 2. An IC memory card 6 serving as the map information storage medium is adapted to be inserted into the slot portion 5 to be electrically connected thereto. The IC memory card 6 comprises a nonvolatile IC memory chip (e.g. EEPROM) embedded in a resin card.

Information on the present position of a vehicle is inputted from a present position detection means 7 into the microcomputer 2. The present position detection means 7 comprises a receiver for receiving radio waves from an artificial satellite, a gyrosensor, a travel distance sensor mounted on an output shaft of a transmission (speed change gear), and a geomagnetic sensor. In accordance with the information from the present position detection means 7, the microcomputer 2 detects the present position of the vehicle.

Information on a destination is inputted from a destination input means 8 into the microcomputer 2. The destination input means 8 comprises a keyboard, or a touch key of a display 10 (later described). A mode signal (later described) is inputted from a mode switching means 9 into the microcomputer 2. The mode switching means 9 comprises push buttons mounted on the housing 1. The display 10 is connected to the microcomputer 2. In accordance with an instruction from the microcomputer 2, the display 10 displays the navigation information.

Figure 2:
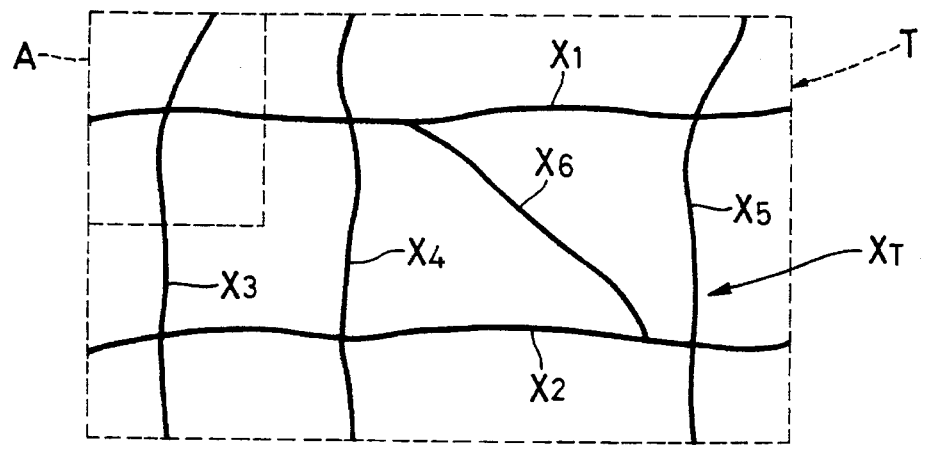
FIG. 2 is an illustration showing an image of map information stored in a storage medium according to the present invention.
Figure 3:
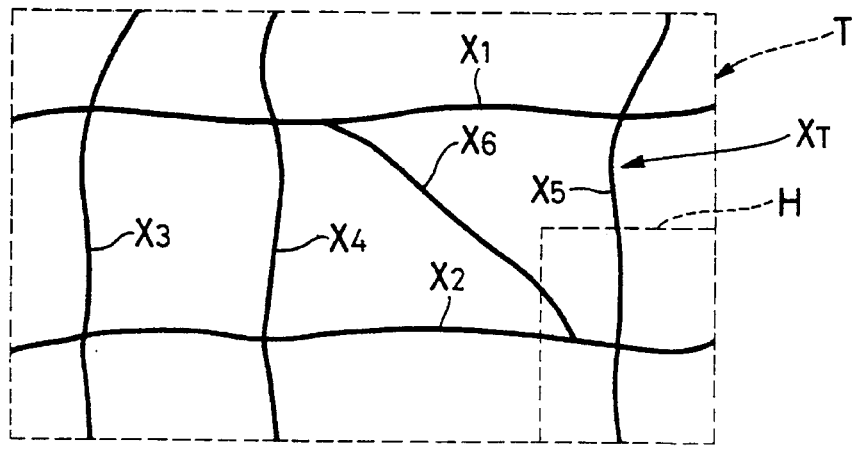
FIG. 3 is an illustration showing an image of map information stored in another storage medium according to the present invention.

The IC memory chip 3 stores the detailed map information of a limited region (e.g. the limited region A) including the home town for the vehicle (in which the driver resides if he owns this vehicle, or a car rental company is located if the vehicle belongs to this rental company) and the information of the highway network $X_T$ over the entire area T of the country (see FIG. 2). Usually, the vehicle runs within the range of the limited region A including the home town, and therefore the navigation system depends only on the map information in the IC memory chip 3 to carry out the navigation. More specifically, when the navigation system is activated, the microcomputer 2 causes the destination input information to be displayed on the display 10. The driver watches this information, and operates the destination input means 8 to input the destination. In accordance with the map information in the IC memory chip 3, the microcomputer 2 computes the optimum route from the present position (i.e., the starting point) to the destination. During the running of the vehicle, the microcomputer 2 computes the navigation information in accordance with the optimum route information and the present position information so that the vehicle can travel along the optimum route, and causes this navigation information to be displayed on the display 10. The navigation information includes an arrow which indicates the direction in which the vehicle should advance at the next intersection.

When the destination is distant from the starting point (the home town), and is outside the limited region A, and is located, for example, in the limited region H, the map information in the IC memory card 6 is used in addition to the map information in the IC memory chip 3. The IC memory card 6 stores the detailed map information of the limited region H and the information of the highway network $X_T$ over the entire area T (see FIG. 3). In accordance with the map information in the IC memory chip 3 and the IC memory card 6, the microcomputer 2 computes the optimum route. In those regions outside the limited regions A and B, the optimum route is constituted by part (for example, highways $X_1$ and $X_6$) of the highway network $X_T$.

As described above, since the IC memory chip 3 and the IC memory card 6 are used, the speed of reading of the map information is high, and the computation of the optimum route as well as the computation of the navigation information can be effected rapidly. Further, by using the information of the highway network $X_T$ over the entire area, the optimum route can be computed only from the map information in the IC memory chip 3 and the IC memory card 6 even if the distance between the starting point and the destination is long. Further, during the travel of the vehicle along the optimum route, the IC memory cards related respectively to the other limited regions do not need to be used.

During the time when the navigation is effected, electrical contacts of the IC memory card 6 are always in contact with electrical contacts of the slot portion 5, and weak electric current flows through these contacts, so that these contacts are deteriorated. In the above embodiment, however, only the IC memory chip 3 is used for the daily navigation (i.e., the navigation near the home town), and the IC memory card 6 is not used, and therefore the deterioration of the contacts of the IC memory card 6 can be restrained.

Figure 6:
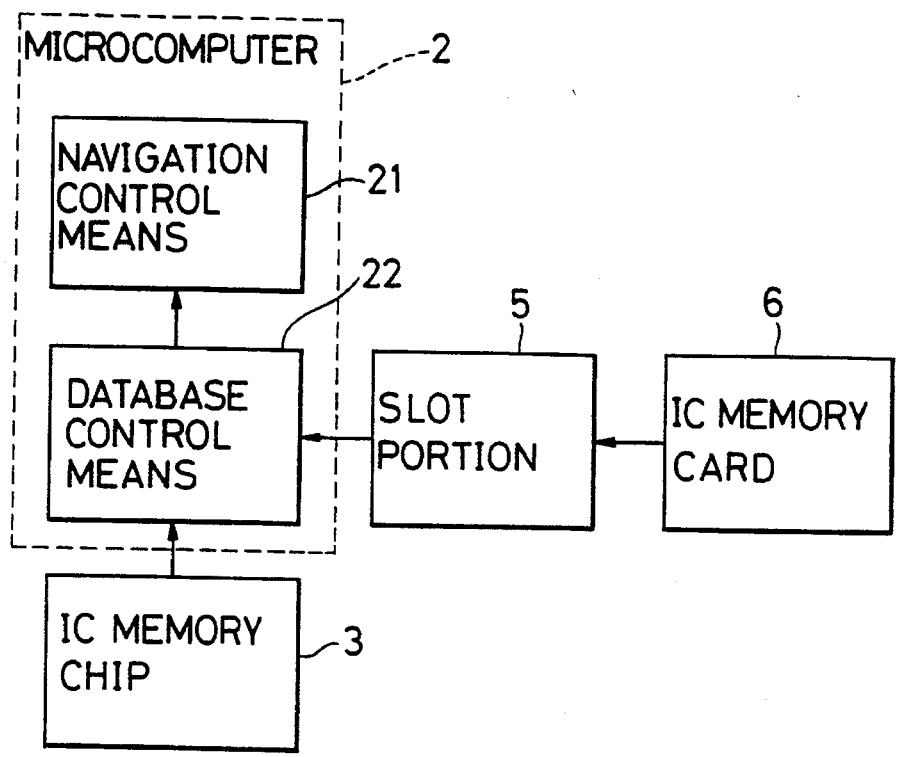
FIG. 6 is a block diagram showing a flow of the map information in a first mode of the above map information-offering system.

As shown in FIG. 6, the microcomputer 2 substantially comprises a navigation control means 21 and a database control means 22. The navigation control means 21 serves to effect the above computation of the optimum route, the computation of the present position, the control of the display 10, and so on. The database control means 22 serves to read and write the map information. This database control means 22, the IC memory chip 3, the IC memory cards 6 and the slot portion 5 jointly constitute the map information-offering system.

The mode switching means 9 designates a control mode of the database control means 22. When the above navigation is to be carried out, a first mode shown in FIG. 6 is designated. In the first mode, the database control means 22 reads the map information from the IC memory chip 3 and if necessary, the map information from the IC memory card 6, and offers these informations to the navigation control means 21.

Figure 7:
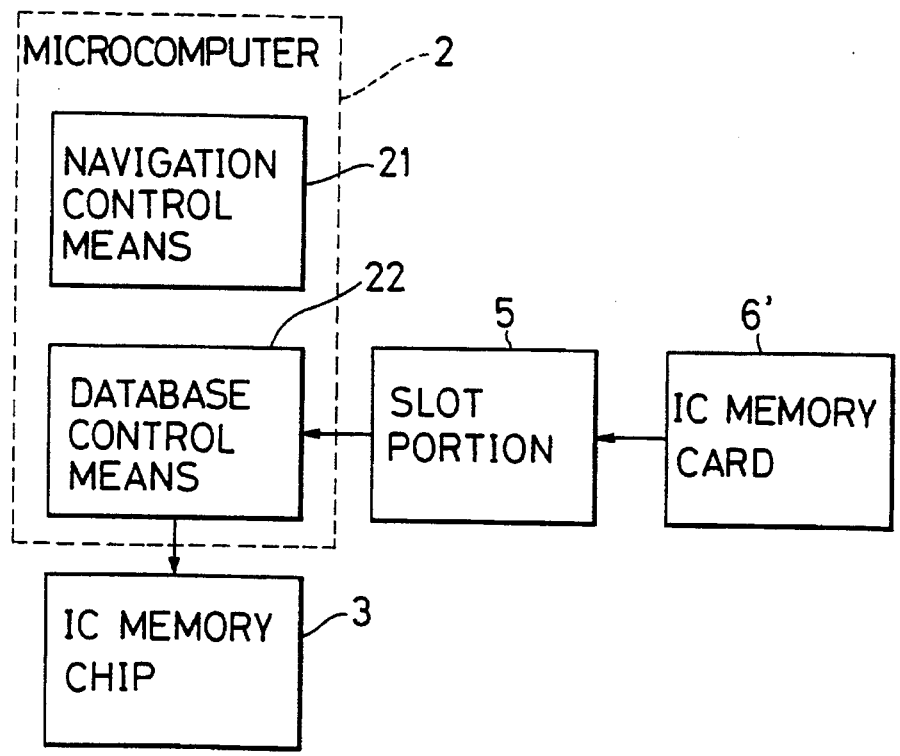
FIG. 7 is a block diagram showing a flow of the map information in a second mode of the above map information-offering system.

When a second mode is designated by the mode switching means 9, the database control means 22 reads the map information from the map information-offering IC memory card 6' through the slot portion 5, and writes this map information onto the IC memory chip 3, as shown in FIG. 7. The map information-offering IC memory card 6' selected from many IC memory cards related respectively to the limited regions A to H is the one related to the region including the home town. When the home town of the vehicle is to be changed, the map information in the IC memory chip 3 is rewritten, using the IC memory card 6' related to the region including the new home town.

Figure 8:
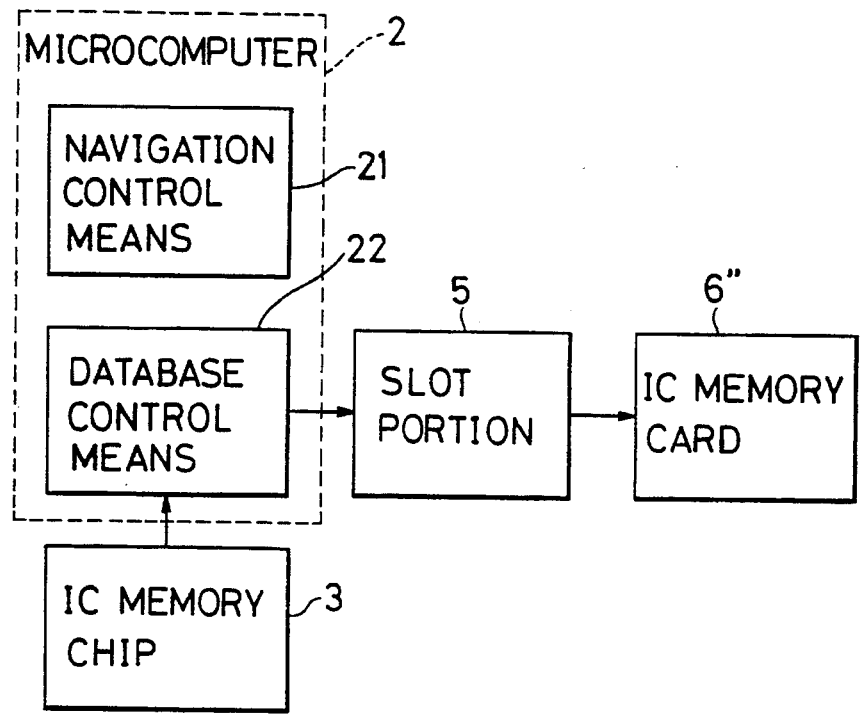
FIG. 8 is a block diagram showing a flow of the map information in a third mode of the above map information-offering system.

When a third mode is designated by the mode switching means 9, the database control means 22 reads the map information from the IC memory chip 3, and writes it onto the IC memory card 6", as shown in FIG. 8.

The present invention is not limited to the above embodiment, and various modifications can be made. Those portions of the following embodiments corresponding to those of the preceding embodiment are designated by identical reference numerals, respectively, and explanation thereof will be omitted. In the embodiment shown in FIG. 9, there are used two IC memory chips 3a and 3b mounted on a printed circuit board. Map informations related respectively to different limited regions are stored in the two IC memory chips 3a and 3b, respectively. For example, the map information related to the limited region to which the starting point or the home town belongs, as well as the information of the highway network $X_T$ over the entire area T, is stored in one IC memory chip 3a as in the IC memory chip 3 of the above embodiment (see FIG. 2). The map information related to the limited region to which the destination belongs, as well as the information of the highway network $X_T$ over the entire area T, is stored in the other IC memory chip 3b (see FIG. 3). The map informations are read respectively from two different map information-offering IC memory cards 6' (only one of which is shown in FIG. 9) by a microcomputer 2, and are written onto the two IC memory chips 3a and 3b, respectively.

Figure 9:
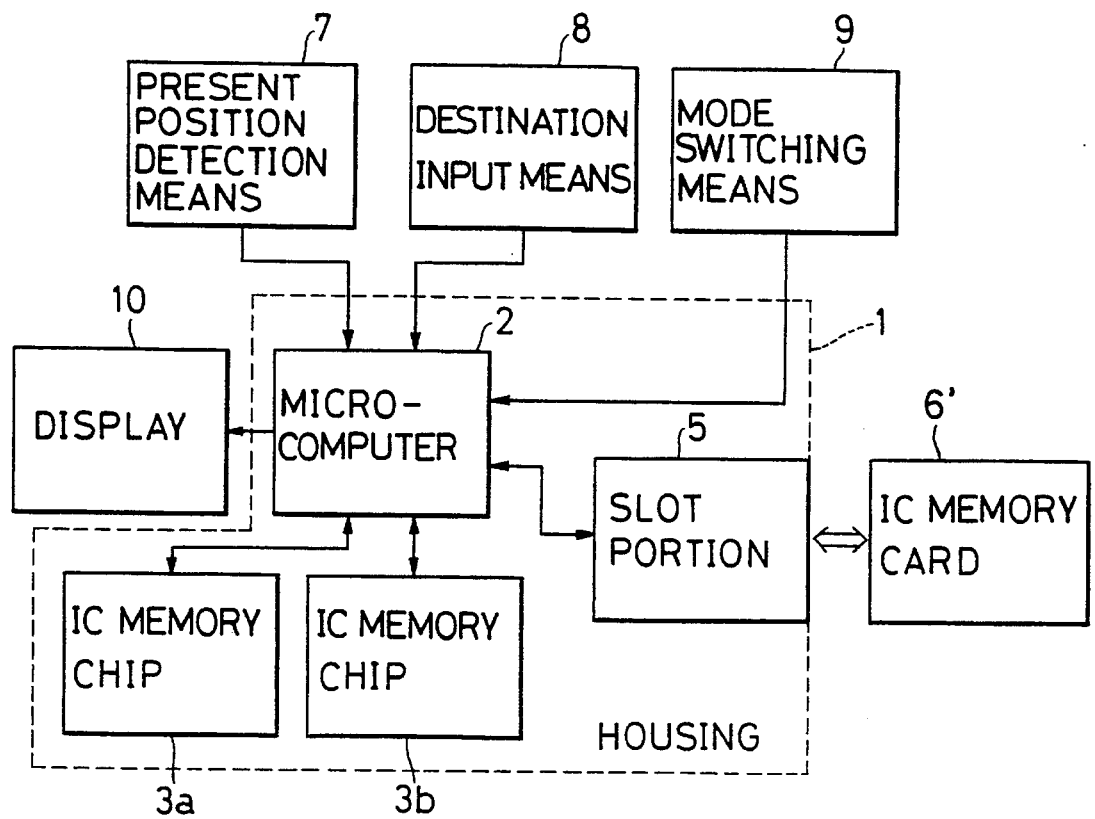
FIG. 9 is a block diagram showing a modified navigation system.

If the IC memory chip has a large capacity, two memory areas of one memory chip may be used instead of using the two IC memory chips of FIG. 9. In this case, the map information (FIG. 2) related to the starting point is stored in one memory area whereas the map information (FIG. 3) related to the destination is stored in the other memory area. In this case, these two memory areas are recognized as memory media independent of each other.

Figure 10:
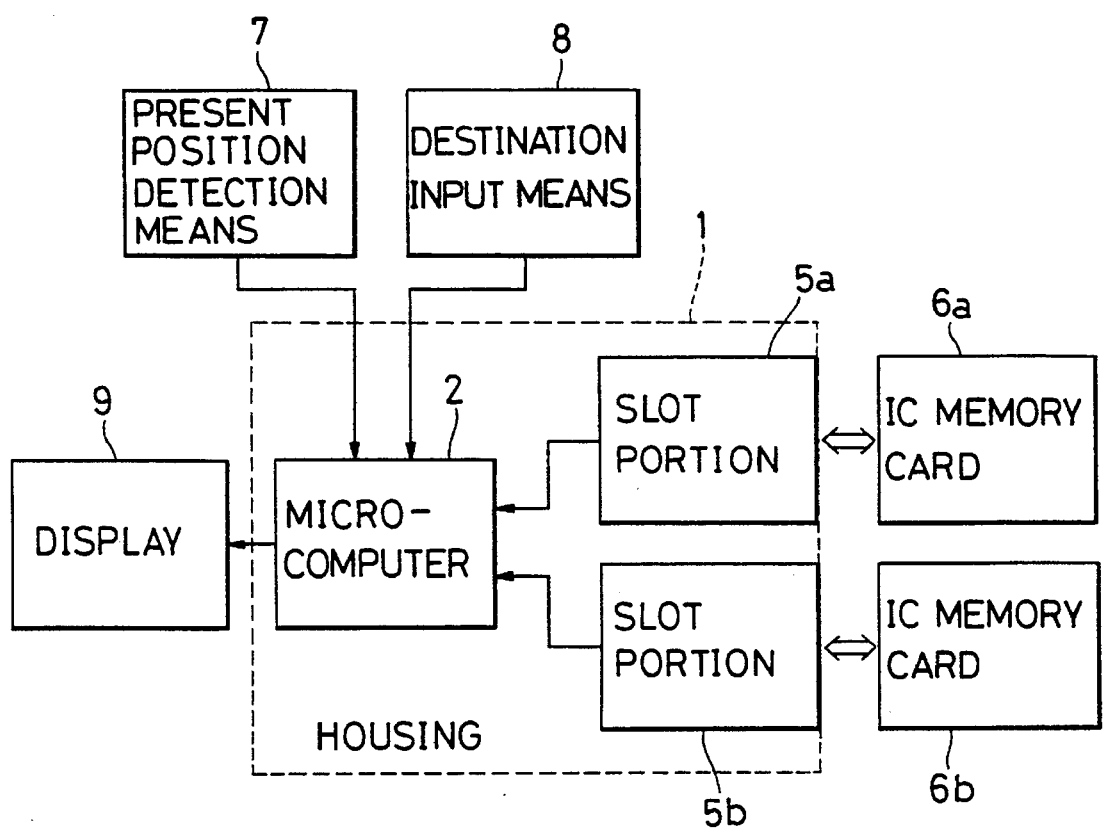
FIG. 10 is a block diagram showing another modified navigation system.

In the embodiment shown in FIG. 10, instead of using the IC memory chip mounted on the printed circuit board, two IC memory cards 6a and 6b are used. A housing 1 has two slot portions 5a and 5b for receiving the IC memory cards 6a and 6b, respectively. The two IC memory cards 6a and 6b respectively store map information related respectively to two different limited regions. For example, the map information (FIG. 2) related to the starting point is stored in one IC memory card 6a whereas the map information (FIG. 3) related to the destination is stored in the other IC memory card 6b.

In all of the above embodiments, although the highway network information is stored in each of the two map information storage media, this highway network information may be stored in only one of the storage media.

What is claimed is:

1. A navigation system, comprising:

(a) a first memory for storing first map information, said first map information including (i) information of a highway network covering the whole of a predetermined area and (ii) map information of only a first limited region more detailed than the information of the highway network, said detailed map information of said first limited region including an ordinary road network, and said predetermined area including said first limited region and being wider than said first limited region;

(b) a second memory for storing second map information, said second memory being separate from said first memory, said second map information including (i) information of at least a part of said highway network in a second limited region and (ii) map information of only a second limited region more detailed than the information of the highway network of only said second limited, said detailed map information of said second limited region including an ordinary road network, and said predetermined area including said second limited region and being wider than said second limited region;

(c) one of said first and second memory being in a form of an IC memory chip mounted on a circuit board and the other being in a form of an IC memory card;

(d) read means for reading said first and second map information from said first and second memory, said read means having a slot portion for electrical connection with said IC memory card; and (e) a microcomputer for computing, based on said first and second map information read by said read means an optimum route from a starting point to a destination, said starting point being inside one of said first and second limited regions, and said destination being inside the other of said first and second limited regions.

2. A system according to claim 1, in which said second memory further contains the information of said highway network covering said predetermined area.

3. A system according to claim 1, further comprising a map information-offering IC memory card, and write means for writing the map information of said map information-offering IC memory card, connected to said slot portion, onto said IC memory chip.

4. A system according to claim 1, further comprising a map information-writing IC memory card, and write means for writing the map information of said IC memory chip onto said map information-writing IC memory card connected to said slot portion.

5. A navigation system, comprising:

(a) a first memory for storing first map information, said first map information including (i) information of a highway network covering the whole of a predetermined area and (ii) map information of only a first limited region more detailed than the information of the highway network, said detailed map information of said first limited region including an ordinary road network, and said predetermined area including said first limited region and being wider than said first limited region;

(b) a second memory for storing second map information, said second memory being separate from said first memory, said second map information including (i) information of at least a part of said highway network in a second limited region and (ii) map information of only a second limited region more detailed than the information of the highway network, said detailed map information of said second limited region including an ordinary road network, and said predetermined area including said second limited region and being wider than said second limited region;

(c) said first and second memory being in the form of IC memory chips mounted on a circuit board;

(d) read means for reading said first and second map information from said first and second memory; and (e) a microcomputer for computing an optimum, based on said first and second map information read by said read means, an optimum route from a starting point to a destination, said starting point being inside one of said first and second limited regions, and said destination being inside the other of said first and second limited regions.

6. A system according to claim 5, further comprising a map information-offering IC memory card, slot means for electrical connection with said IC memory card, and write means for writing the map information of said IC memory card, connected to said slot means, onto at least one of said two IC memory chips.

7. A system according to claim 5 in which said second memory further contains the information of said highway network covering said predetermined area.

8. A system for offering map information for a navigation system, comprising:

(a) a first memory for storing first map information, said first map information including (i) information of a highway network covering the whole of a predetermined area and (ii) map information of only a first limited region more detailed than the information of the highway network, said detailed map information of said first limited region including an ordinary road network, and said predetermined area including said first limited region and being wider than said first limited region;

(b) a second memory for storing second map information, said second memory being separate from said first memory, said second map information including (i) information of at least a part of said highway network in a second limited region and (ii) map information of only a second limited region more detailed than the information of the highway network, said detailed map information of said second limited region including an ordinary road network, and said predetermined area including said second limited region and being wider than said second limited region;

(c) said first and second memory being in the form of IC memory cards;

(d) read means for reading said first and second map information from said first and second memory, said read means having two slot portions for electrical connection with said first and second memory, respectively; and (e) a microcomputer for computing, based on said first and second map information read by said read means, an optimum route from a starting point to a destination, said starting point being inside one of said first and second limited regions, and said destination being inside the other of said first and second limited regions.

9. A system according to claim 8 in which said second memory further contains the information of said highway network covering said predetermined area.

* * * * *